(12) United States Patent
Yaeger (10) Patent No.: US 10,681,144 B1
(45) Date of Patent: *Jun. 9, 2020

(54) METHOD AND APPARATUS FOR CONFIGURING A DATA SOURCE NAME (DSN) FOR USE DURING A DATA SOURCE ACCESS

(71) Applicant: OPEN INVENTION NETWORK LLC, Durham, NC (US)

(72) Inventor: Marc Todd Yaeger, Hoover, AL (US)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/683,528

(22) Filed: Aug. 22, 2017

Related U.S. Application Data

(63) Continuation of application No. 15/437,316, filed on Feb. 20, 2017, now Pat. No. 9,742,850, which is a continuation of application No. 15/238,248, filed on Aug. 16, 2016, now Pat. No. 9,578,108, which is a continuation of application No. 13/769,336, filed on Feb. 17, 2013, now Pat. No. 9,419,853, which is a continuation of application No. 13/118,633, filed on May 31, 2011, now Pat. No. 9,098,548.

(60) Provisional application No. 61/354,395, filed on Jun. 14, 2010.

(51) Int. Cl.
*H04L 29/08* (2006.01)
*G06F 9/54* (2006.01)
*G06F 16/25* (2019.01)

(52) U.S. Cl.
CPC ............ *H04L 67/141* (2013.01); *G06F 9/547* (2013.01); *G06F 16/25* (2019.01); *G06F 16/252* (2019.01)

(58) Field of Classification Search
CPC ............... H04L 67/141; G06F 17/3056; G06F 17/30557; G06F 9/547
See application file for complete search history.

(56) References Cited

U.S. PATENT DOCUMENTS

| | | | | |
|---|---|---|---|---|
| 5,475,836 | A | * 12/1995 | Harris | ............... G06F 17/30566 |
| 2003/0004930 | A1 | * 1/2003 | Minder | ............. G06F 17/30365 |
| 2007/0204019 | A1 | * 8/2007 | Martynov | ............... H04L 43/06 709/223 |

* cited by examiner

*Primary Examiner* — Thai Nguyen (57) ABSTRACT

Certain aspects of the present disclosure relate to a technique to configure a data source name (DSN) for use during a data source access. A driver is selected. An identifier is provided that identifies a class, and a library or an application that implements a driver interface for accessing the data source. A connection string is forwarded with the identifier from an implementation of the driver interface to the driver. The connection string is forwarded from the driver to a driver manager managing a client.

20 Claims, 10 Drawing Sheets

METHOD AND APPARATUS FOR CONFIGURING A DATA SOURCE NAME (DSN) FOR USE DURING A DATA SOURCE ACCESS

CROSS REFERENCE TO RELATED APPLICATIONS

This application claims priority from and is a continuation of U.S. application Ser. No. 15/437,316, filed on Feb. 20, 2017, entitled METHOD AND APPARATUS FOR CONFIGURING A DATA SOURCE NAME (DSN) FOR USE DURING A DATA SOURCE ACCESS, issued as U.S. Pat. No. 9,742,850 on Aug. 22, 2017, which is a continuation of U.S. application Ser. No. 15/238,248, filed on Aug. 16, 2016, entitled METHOD AND APPARATUS FOR CONFIGURING A DATA SOURCE NAME (DSN) FOR USE DURING A DATA SOURCE ACCESS, issued as U.S. Pat. No. 9,578,108 on Feb. 21, 2017, which is a continuation of U.S. application Ser. No. 13/769,336, filed on Feb. 17, 2013, entitled METHOD AND APPARATUS FOR CONFIGURING A DATA SOURCE NAME (DSN) FOR USE DURING A DATA SOURCE ACCESS, issued as U.S. Pat. No. 9,419,853 on Aug. 16, 2016, which is a continuation of U.S. application Ser. No. 13/118,633, filed on May 31, 2011, entitled METHOD AND APPARATUS FOR ACCESSING A DATA SOURCE FROM A CLIENT USING A DRIVER, issued as U.S. Pat. No. 9,098,548 on Aug. 4, 2015 which in turn claims priority to U.S. Provisional Application Ser. No. 61/354,395, filed on Jun. 14, 2010, entitled MYRIAD ODBC DRIVER. The above applications are incorporated herein by reference.

FIELD OF THE INVENTION

Embodiments of the invention generally relate to computer software applications and, more particularly, to a method and apparatus for configuring a data source name (DSN) for use during a data source access.

BACKGROUND OF THE INVENTION

Data is key to any organization and IT's role is to provide access to the data. Over the years many methods have been used to allow access to that data. Service Oriented Architecture (SOA) is the latest concept to provide data to clients while isolating the client's involvement in the details of retrieving the data. This allows for the source of the data to change while keeping the client isolated and oblivious from the change. Service Oriented Architecture (SOA) provide a good way to abstract data to a consumer but the consumers are limited to those application that can work with a service. The SOA application typically takes the form of client application(s) connecting to one or more web services to provide specific data. This works well for new applications but does not address accessing existing application that may need that data especially existing applications that cannot be rewritten or modified to allow access to service based data.

SUMMARY OF THE INVENTION

Certain aspects of the present disclosure provide a method to configure a data source name (DSN) for use during a data source access. The method generally includes selecting a driver, providing an identifier that identifies a class, and a library or an application that implements a driver interface to access the data source, forwarding a connection string with the identifier from an implementation of the driver interface to the driver and forwarding the connection string from the driver to a driver manager managing a client.

Certain aspects of the present disclosure provide an apparatus to configure a data source name (DSN) for use during a data source access. The apparatus generally includes at least one processor and a memory coupled to the at least one processor. The processor is generally configured to select a driver, provide an identifier that identifies a class, and a library or an application that implements a driver interface to access the data source, forward a connection string with the identifier from an implementation of the driver interface to the driver and forward the connection string from the driver to a driver manager which manages a client.

Certain aspects of the present disclosure provide a computer-program product to configure a data source name (DSN) for use during a data source access, the computer-program product generally including a computer-readable medium comprising code to select a driver, provide an identifier that identifies a class, and a library or an application that implements a driver interface to access the data source, forward a connection string with the identifier from an implementation of the driver interface to the driver and forward the connection string from the driver to a driver manager managing a client.

BRIEF DESCRIPTION OF DRAWINGS

In the accompanying figures, similar reference numerals may refer to identical or functionally similar elements. These reference numerals are used in the detailed description to illustrate various embodiments and to explain various aspects and advantages of the present disclosure.

The foregoing summary, as well as the following detailed description of certain embodiments of the present invention, will be better understood when read in conjunction with the appended drawings. The drawings illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

It should be observed that apparatus parts and components have been represented by conventional symbols in the drawings, showing only specific details that are relevant for an understanding of the present disclosure. Further, details that may be readily apparent to person ordinarily skilled in the art may not have been disclosed.

Certain aspects of the disclosure include creating an open data base connectivity (ODBC) driver (e.g. Myriad ODBC driver) which routes requests from a driver manager on a Windows-based system to Component Object Model (COM) based applications or libraries that implement an interface (e.g. IMyriad interface) published by the Myriad ODBC driver.

Typically an ODBC driver connects to a particular version of a datasource provider which can be configured on WINDOWS™-based systems using administration tool. The properties that may be configured are typically defined by the driver. To connect using the Myriad ODBC Driver, the Myriad ODBC Driver only requires a Program Identifier (ProgId) which identifies a class and the library or application that implements the IMyriad interface that is published by the driver. Any other properties that may be required to connect is typically handled by the COM based datasource that implements the IMyriad interface.

Once a client has connected using the Myriad ODBC Driver, all ODBC calls are then passed on to an implementation of the IMyriad Interface.

In certain aspects, by using ODBC as the client application connection point, existing applications can access any type of data and by using COM as the method to provide data to the driver, developers can write COM-based applications or libraries that can act as data source. Both ODBC and COM are well defined and mature technologies and thus developers may leverage this existing knowledge base to provide data to clients.

In certain aspects the operations that may be performed by developers may include:
A. Implement the IMyriad interface using C++, .Net languages, VB or any other language;
B. Register the COM library or application on the client's system;
C. Modify existing Data Source Name(s) (DSN) to use the Myriad ODBC Driver so that current applications may connect to new datasources.
D. Develop applications that utilize the Myriad ODBC Driver in any language that supports ODBC connectivity.

In certain aspects, operations that may be performed by clients may include:
A. On WINDOWS™-based systems, clients (or users) may use the ODBC Data Source Administrator to create a file, system or user Data Source Name (DSN) that stores information on how to connect to the datasource using the Myriad ODBC Driver.
B. Users may then access the data using any of the MICROSOFT OFFICE™ applications, MSQuery, ADO or any other data access tools that can use ODBC.

In certain aspects, for already existing applications, the existing Data Source Name(s) (DSN) may be modified to use the Myriad ODBC Driver so that current applications may connect to new data sources. For those applications that allow the data source to be configured, a DSN may be created that uses the Myriad ODBC Driver.

The Myriad ODBC Driver, using two well defined and mature technologies such as COM and ODBC, provides client applications such as MICROSOFT OFFICE™ products access to various datasources, such as web-services, that may be configured and accessed by non-developers.

Figure 1:
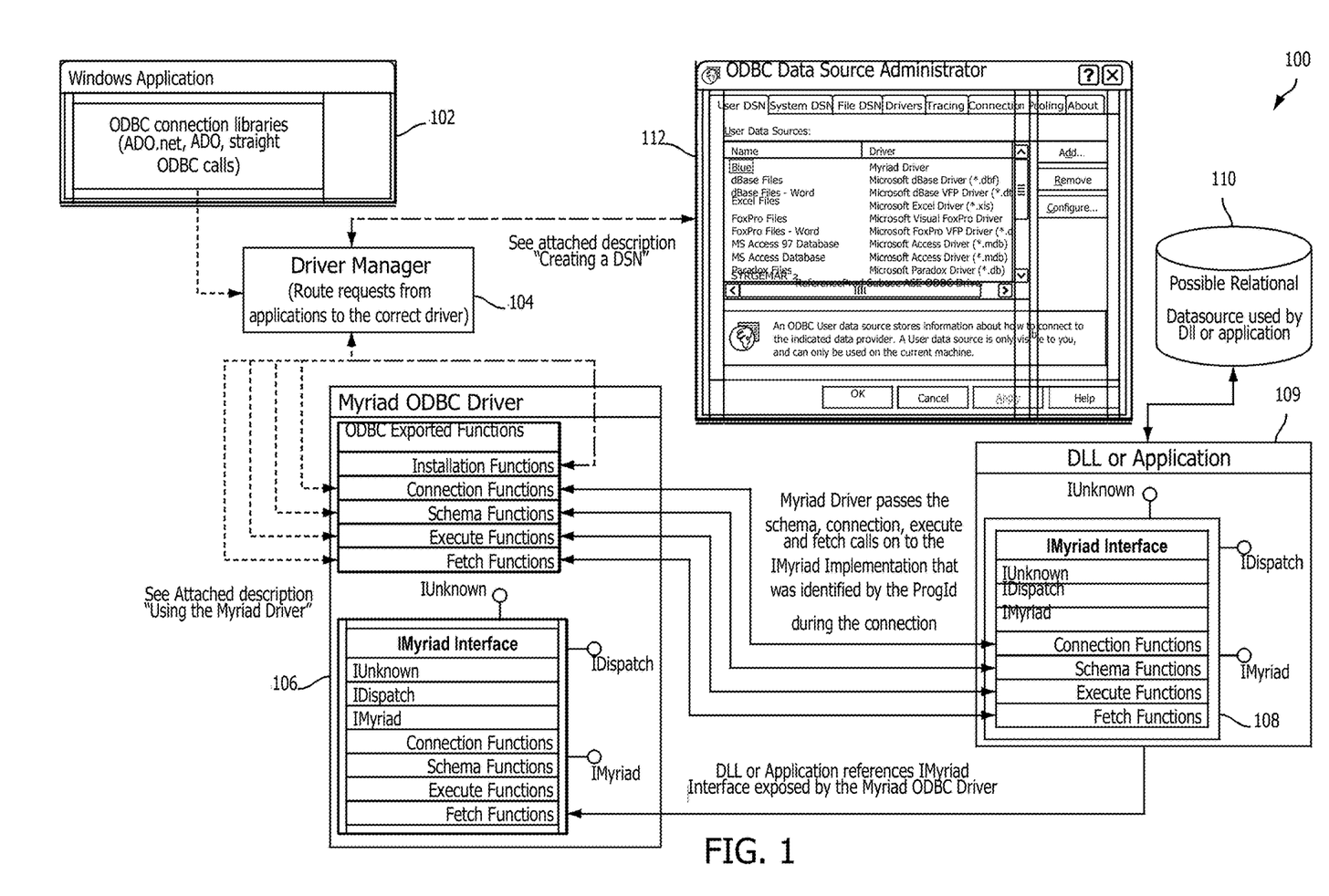
FIG. 1 illustrates a system for accessing a data source from a client using a Myriad driver in accordance with certain aspects of the disclosure.

FIG. 1 illustrates a system for accessing a data source from a client using a Myriad driver in accordance with certain aspects of the disclosure. Myriad ODBC driver 106 facilitates client 102 to access data source 110.

According to certain aspects, a DSN is first created using the ODBC data source administrator 112 and passed on to the driver manager 104. In certain aspects, the creation of the DSN starts with a user selecting Myriad ODBC driver 106 in a dialog box of the ODBC data source administrator 112. The ODBC driver 106 prompts the user to provide a ProgID which is used to find an IMyriad implementation for IMyriad interface 108. The IMyriad interface 108 facilitates access to data source 110. The driver 106 passes control over to the IMyriad implementation to get the required connection settings. The IMyriad implementation may then pass out a complete connection string to the driver 106 which may then pass it out to the driver manager 104 which may write it out for later use.

In certain aspects, once the DSN is created, a consumer may attempt to connect to the data source 110 using the DSN created by in the ODBC data source administrator 112 or by passing a complete connecting string specifying a driver name of the ODBC driver 106 and the ProgID for the IMyriad implementation of IMyriad interface 108. The driver 106 then loads the IMyriad implementation based on the ProgID. Once the IMyriad implementation is loaded, the driver 106 marshals all ODBC calls (or requests) from client 102 (via driver manager 104) to the IMyriad implementation to handle the requests. Thus, the Myriad acts as an interface between the driver manager 104 and custom implementations of the IMyriad interface 108. In certain aspects, all data and schema requests from the client 102 are routed through the driver manager to the driver 106 and then to the IMyriad implementation of the IMyriad interface 108 that was connected using the ProgID property.

In certain aspects, while connecting to the IMyriad implementation, the connection string must contain either a DSN or at least the driver name of the Myriad driver 106. The driver manager 104 typically determines which driver to load. In certain aspects, if a ProgID for the IMyriad implementation is not included in the string, the driver 106 will prompt for the ProgID that identifies the library or applications 109 and class that implements the IMyriad interface 108. With the ProgID, the connection information is then routed to the IMyriad implementation. Then the user may be prompted for any information that is required to complete the connection. The connection result may then be passed back to the driver 106 which may then be passed back to the calling application (client 102) through the driver manager 104.

FIGS. 2a-2f illustrate steps for creating a database source name (DSN) in accordance with certain aspects of the disclosure. A database source name (DSN, often also known as a data source name) in general refers to a data structure that contains the information about a specific data source (database or other data source) that is needed by an Open Database Connectivity (ODBC) driver in order to connect to it. A DSN usually resides either in a registry or in a separate text file. It stores information such as name of the data source, directory of the data source, name of a driver which can access the data source, user ID for database access (if required) and user password for database access (if required).

Figure 2A:
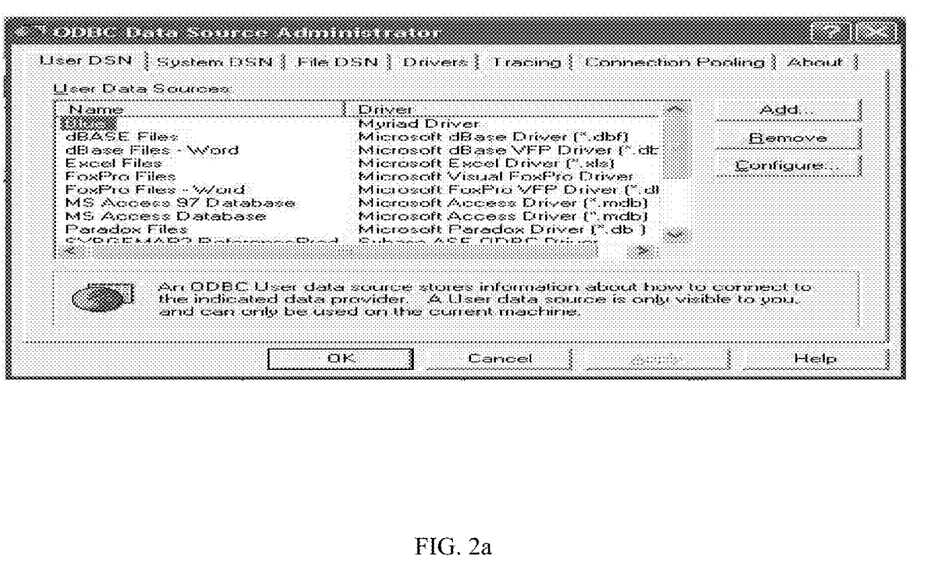
FIGS. 2a-2f illustrate steps for creating a database source name (DSN) in accordance with certain aspects of the disclosure.

For creating the DSN, ODBC Data Source Administration Tool is launched. For example FIG. 2a illustrates a dialog box for a data source administration tool. Subsequently, a File, system or a User Tab is selected. For example, the "User DSN" tab is currently selected in the tool dialog box of FIG. 2a. The user selects a data source name and clicks the "Add" button.

Figure 2B:
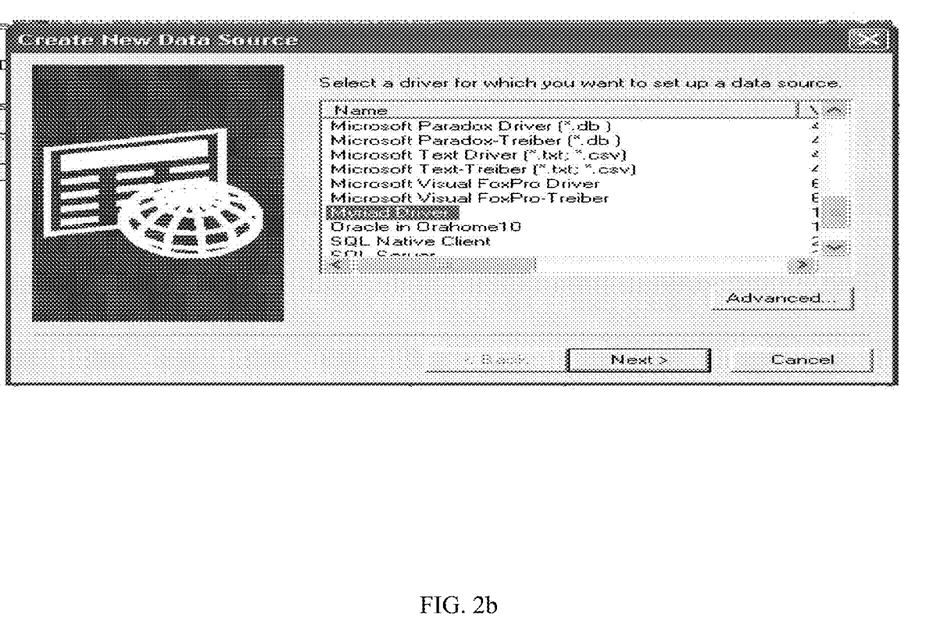
Figure 2C:
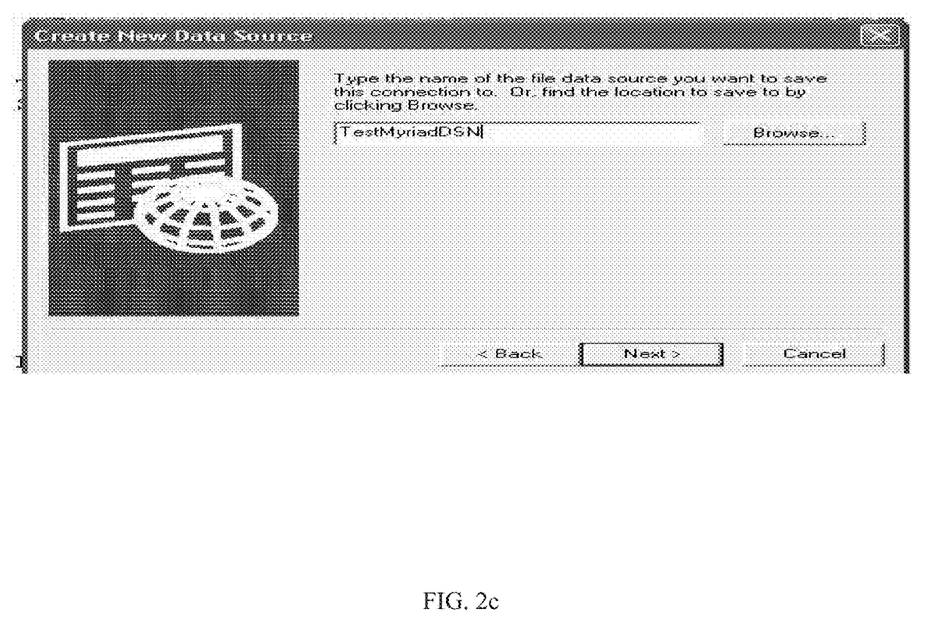
Figure 2D:
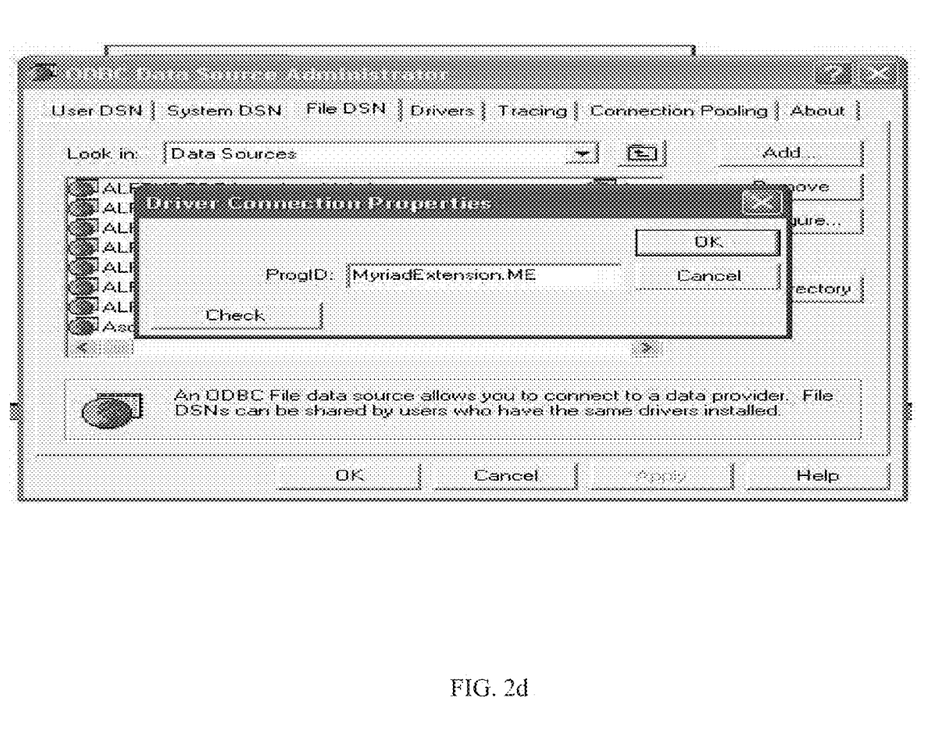
Figure 2E:
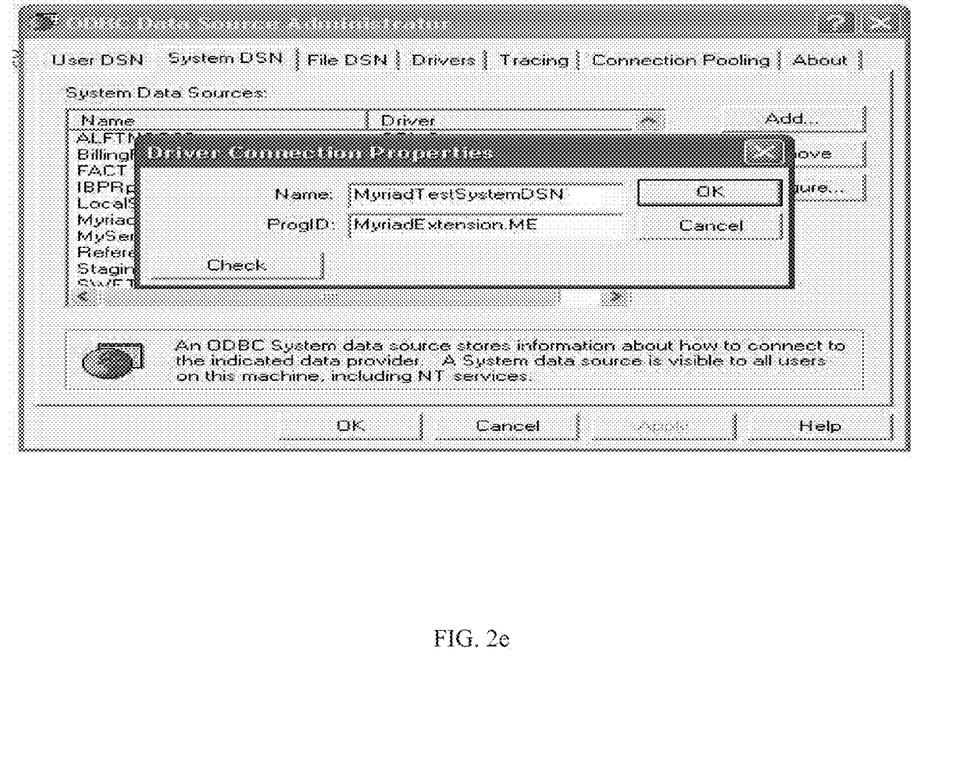
Figure 2F:
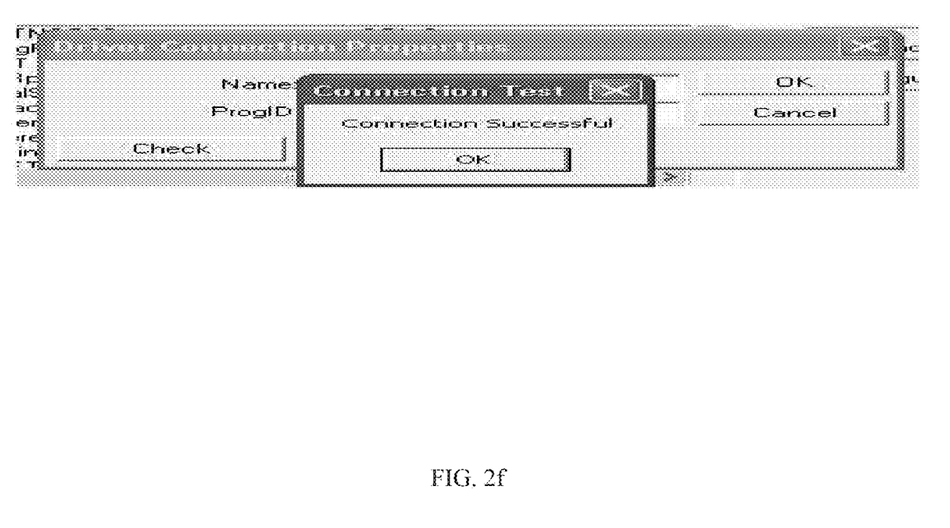

In FIG. 2b, a "Create New Data Source" dialog box is illustrated. The user selects a driver for setting up a data source, for e.g. the user selects the Myriad Driver in the dialog box of FIG. 2b. In FIG. 2c, the user is then prompted to provide a name for the DSN file that will be created. In FIG. 2d, the user is prompted to provide a ProgID for the IMyriad implementation via a "Driver Connection Properties" dialog box. In certain aspects, the user may be prompted to provide a DSN name as illustrated in FIG. 2e. Clicking the "Check" button in FIG. 2e will attempt to load the IMyriad implementation and route the connection information. In certain aspects, if the implementation requires additional information, it may prompt the user for additional information or provide default values. If the IMyriad implementation connection method returns "True", then a dialog box returns "Connection Successful" as illustrated in FIG. 2f.

In certain aspects, clicking "OK" button in the dialog box of FIG. 2e will, like clicking "Check" button, attempt to load the IMyriad implementation and route the connection information. If the implementation requires additional information, it may prompt the user for additional information or provide default values. This may then pass the connection information to the Driver Manager to write either to File, System Registry setting or a User Registry setting. The new DSN will now appear in the ODBC Data Source Administration tool.

In certain aspects, an existing DSN may be configured by passing the request on to the IMyriad implementation to prompt for any additional information to connect. This may then be passed back to the Myriad driver to modify the File DSN or the System or User registry setting.

In certain aspects, an existing DSN may be removed by selecting the type of DSN which may be any of the File, System or User and removing it by clicking a remove button.

Figure 3:
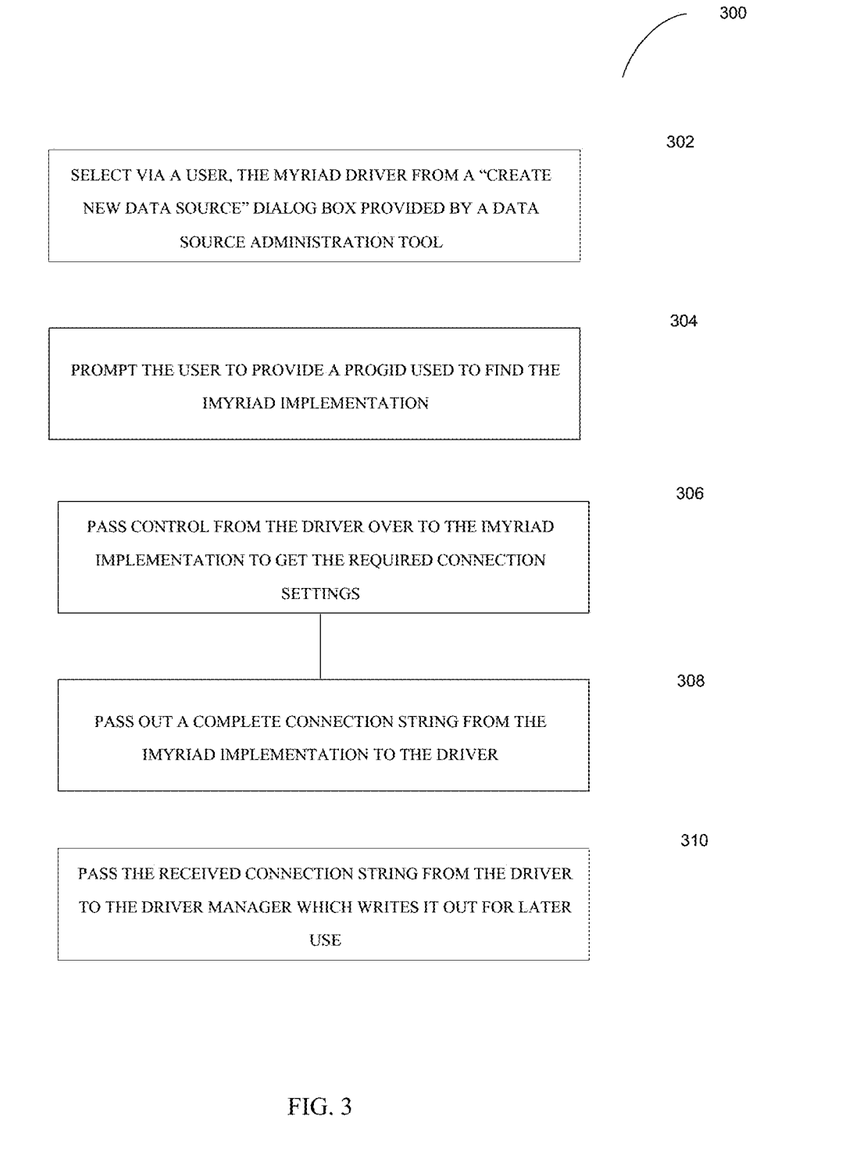
FIG. 3 is a flow diagram illustrating a process for creating a Data Source Name (DSN) in accordance with certain aspects of the disclosure.

FIG. 3 is a flow diagram illustrating a process 300 for creating a Data Source Name (DSN) in accordance with certain aspects of the disclosure. Process 300 starts at 302 with a user selecting the Myriad driver from a "Create New Data Source" dialog box provided by a data source administration tool. At 304, the driver prompts the user to provide a ProgID used to find the IMyriad implementation. At 306, the driver passes control over to the IMyriad implementation to get the required connection settings. At 308, the IMyriad implementation passes out a complete connection string to the driver. At 310, the driver passes the received connection string to the driver manager which writes it out for later use.

Figure 4:
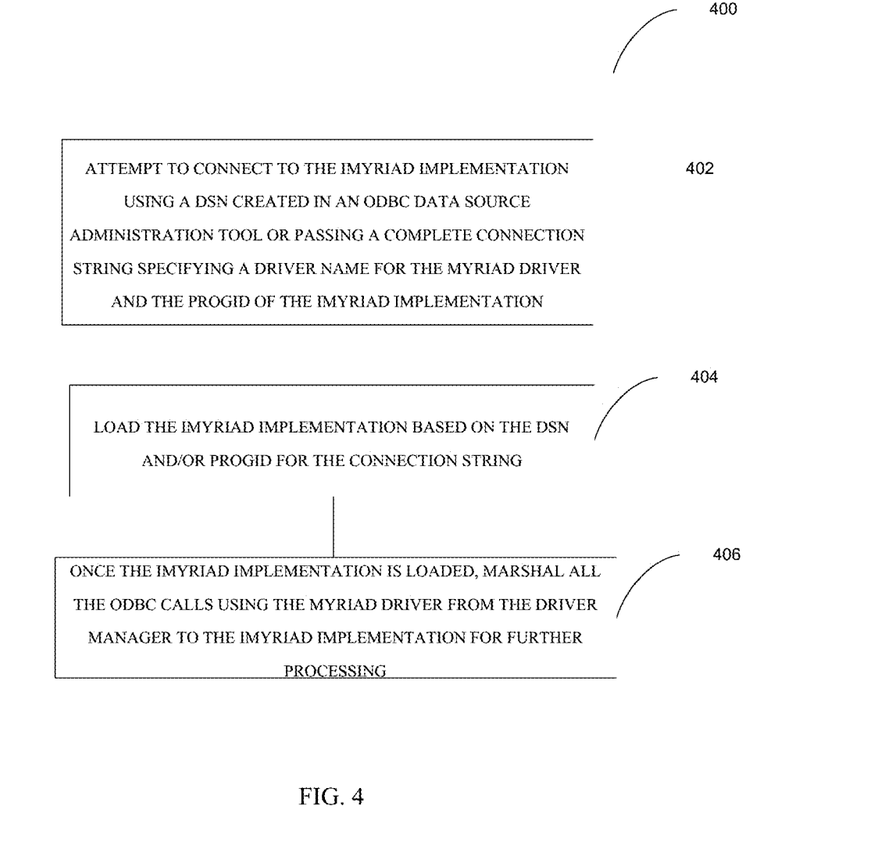
FIG. 4 is a flow diagram illustrating a process for connecting to an IMyriad implementation via a Myriad driver and using the Myriad driver to access a data source in accordance with certain aspects of the disclosure.

FIG. 4 is a flow diagram illustrating a process 400 for connecting to an IMyriad implementation via a Myriad driver and using the Myriad driver to access a data source in accordance with certain aspects of the disclosure. Process 400 starts at 402 with the user attempting to connect to the IMyriad implementation using a DSN created in an ODBC Data Source Administration Tool or passing a complete connection string specifying a driver name for the Myriad driver and the ProgID of the IMyriad implementation. At 404, the Myriad driver loads the IMyriad implementation based on the DSN and/or ProgID for the connection string. At 406, once the IMyriad implementation is loaded, the Myriad driver marshals all the ODBC calls from the driver manager to the IMyriad implementation for further processing.

Figure 5:
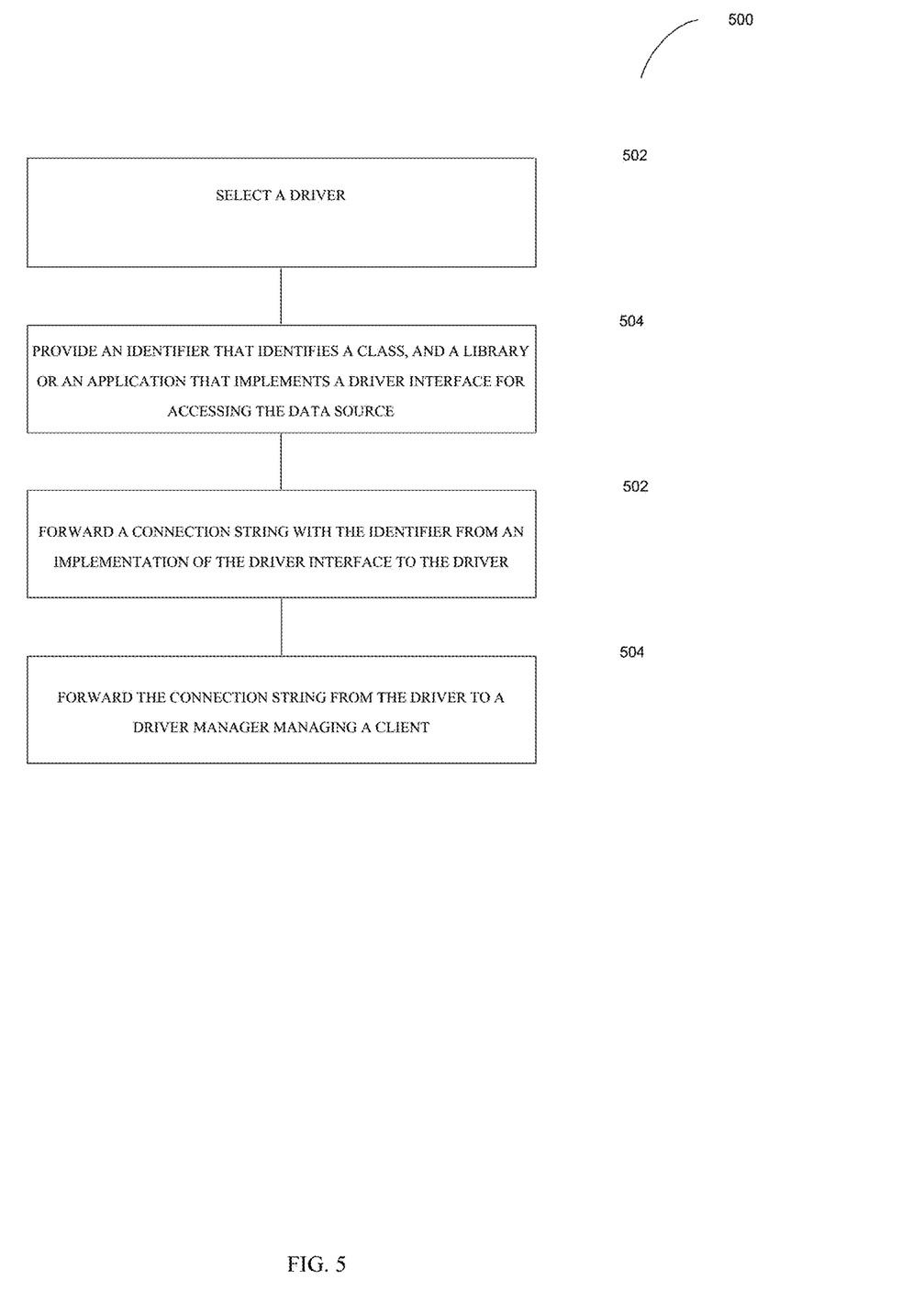
FIG. 5 is a flow diagram illustrating a process for configuring a data source name (DSN) for use during a data source access in accordance with certain aspects of the disclosure.

FIG. 5 is a flow diagram illustrating a process 500 for configuring a data source name (DSN) for use during a data source access in accordance with certain aspects of the disclosure. Process 500 starts at 502 with selecting a driver. At 504, an identifier is provided that identifies a class, and a library or an application that implements a driver interface for accessing the data source. At 506, a connection string is forwarded with the identifier from an implementation of the driver interface to the driver. At 508, the connection string is forwarded from the driver to a driver manager managing a client.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
    accessing or creating, by an administrator, a data source name (DSN) in a tool, the data source name (DSN) corresponding to a driver, the driver corresponding to an open data base connectivity driver executing on a computer;
    receiving, by the driver, an identifier that identifies a data source and at least one of a library or an application of the data source that implements a driver interface for the driver to access the data source, the identifier including information indicating a class of the data source;
    using the identifier, by the driver executing on the computer, to access an implementation of the driver interface of the data source;
    transferring, by the driver, control from the driver executing on the computer to the implementation of the driver interface of the data source;
    determining, by the implementation of the driver interface, connection settings for the data source and generating a connection string, the connection settings to establish a connection between the data source and the driver or the driver interface;
    passing out, by the implementation of the driver interface of the data source, the connection string based at least on the connection settings;
    receiving, by the driver executing on the computer, the connection string with the identifier from the implementation of the driver interface to the driver; and
    forwarding the connection string from the driver to a driver manager managing a client.

2. The method of claim 1, further comprising accessing, when the driver is used by the client, the data source based on the data source name (DSN) which corresponds to the driver.

3. The method of claim 2, wherein the data source name (DSN) is an existing DSN, the method further comprising modifying, by the tool, the existing DSN to use the driver so that a current client application can connect to the data source.

4. The method of claim 2, further comprising creating, by the tool, the DSN that uses the driver for a client application that allows the data source to be configured.

5. The method of claim 2, wherein the implementation of the driver interface of the data source prompts for additional information while configuring the DSN.

6. The method of claim 5, wherein the implementation of the driver interface of the data source provides default values for any additional information.

7. The method of claim 1, further comprising selecting the driver by a driver manager.

8. An apparatus, comprising:
    a driver to access a data source;
    a memory comprising instructions and coupled to the at least one processor;
    at least one processor, communicably coupled to the memory, and configured to read the instructions to perform:
        accessing or creating, by an administrator, a data source name (DSN) which corresponds to a driver, the driver corresponding to an open data base connectivity driver;
        receive, by the driver, an identifier that identifies the data source and at least one of a library or an application of the data source that implements a driver interface for the driver to access the data source, the identifier including information indicating a class of the data source;
        use the identifier to access an implementation of the driver interface of the data source;
        transfer, by the driver, control from the driver to the implementation of the driver interface of the data source;
        receiving, from the implementation of the driver interface of the data source, a connection string based at least on connection settings, the connection settings to establish a connection between the data source and the driver or the driver interface;
        receive a connection string with the identifier from the implementation of the driver interface of the data source to the driver; and
        forward the connection string from the driver to a driver manager which manages a client.

9. The apparatus of claim 8, wherein the driver is used by the client to access the data source based on the data source name (DSN) which corresponds to the driver.

10. The apparatus of claim 9, wherein the DSN is an existing DSN, and wherein the at least one processor is further configured to modify the existing DSN to use the driver so that a current client application can connect to the data source.

11. The apparatus of claim 9, wherein the at least one processor is further configured to create the DSN that uses the driver for a client application that allows the data source to be configured.

12. The apparatus of claim 9, wherein the implementation of the driver interface of the data source prompts for additional information while configuring the DSN.

13. The apparatus of claim 12, wherein the implementation of the driver interface of the data source provides default values for any additional information.

14. The apparatus of claim 9, wherein the at least one processor is further configured to select the driver.

15. A non-transitory computer-readable medium comprising code executable by at least one processor that, when executed, causes the at least one processor to:

access or create, by an administrator, a data source name (DSN) in a tool, the data source name (DSN) corresponding to a driver, the driver corresponding to an open data base connectivity driver executing on a computer;

receive, by the driver, an identifier that identifies a data source and at least one of a library or an application of the data source that implements a driver interface for the driver to access the data source, the identifier including information indicating a class of the data source;

transfer, by the driver, control from the driver to the implementation of the driver interface of the data source in order to access connection settings to establish a connection between the data source and the driver or the driver interface;

determining, by the implementation of the driver interface, connection settings for the data source and generating a connection string;

receive a connection string from the implementation of the driver interface, the connection string based at least on the connection settings;

receive the connection string with the identifier from an implementation of the driver interface to a driver; and forward the connection string from the driver to a driver manager managing a client.

16. The non-transitory computer-program product of claim 15, wherein the driver is used by the client to access the data source based on the data source name (DSN) which corresponds to the driver.

17. The non-transitory computer-program product of claim 16, wherein the DSN is an existing DSN and wherein the at least one processor is to modify the existing DSN to use the driver so that a current client application can connect to the data source.

18. The non-transitory computer-program product of claim 16, wherein the at least one processor is to create the DSN that uses the driver for a client application that allows the data source to be configured.

19. The non-transitory computer-program product of claim 16, wherein the implementation of the driver interface of the data source prompts for additional information while configuring the DSN.

20. The non-transitory computer-program product of claim 19, wherein the implementation of the driver interface of the data source provides default values for any additional information.

* * * * *